US007512276B2

(12) United States Patent
Fung et al.

(10) Patent No.: US 7,512,276 B2
(45) Date of Patent: Mar. 31, 2009

(54) SYSTEM AND METHOD FOR FEATURE IDENTIFICATION IN DIGITAL IMAGES BASED ON RULE EXTRACTION

(75) Inventors: Glenn Fung, Bryn Mawr, PA (US); Sathyakama Sandilya, Fontainebleau (FR); R. Bharat Rao, Berwyn, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 654 days.

(21) Appl. No.: 11/145,886

(22) Filed: Jun. 6, 2005

(65) Prior Publication Data
US 2005/0286773 A1      Dec. 29, 2005

Related U.S. Application Data

(60) Provisional application No. 60/577,792, filed on Jun. 8, 2004.

(51) Int. Cl.
*G06K 9/62* (2006.01)
(52) U.S. Cl. .................. 382/225; 382/128; 382/224; 382/226; 382/227; 382/228
(58) Field of Classification Search .............. 382/128, 382/224, 225, 226, 227, 228
See application file for complete search history.

(56) References Cited

OTHER PUBLICATIONS

Nunez et al, Support Vector Machines with Symbolic Interpretation, Nov. 11-14, 2002, IEEE Proceedings of the VII Brazilian Symposium on Neural Networks, pp. 142-147.*

El-Naqa et al, A Support Vector Machine Approach for Detection of Microcalcifications, Dec. 2002, IEEE Transactions on Medical Imaging, vol. 21, No. 12, pp. 1552-1563.*
Chaudhuri, B. B., "Applications of Quadtree, Octree, and Binary Tree Decomposition Techniques to Shape Analysis and Pattern Recognition", *IEEE Transations of Pattern Analysis and Machine Intelligence*, vol. PAMI-7, No. 6, , Nov.1985, pp. 652-661.
Uebele V. et al., "Extracting Fuzzy Rules From Pattern Classification Neural Networks", *Proceedings of the International Conference on Systems, Man and Cybernetics*, vol. 3, Oct. 17, 1993, pp. 578-583.
Kudo M. et al., "Construction of Class Regions by a Randomized Algorithm: A Randomized Subclass Method", *Pattern Recognition*, Elsevier, Kidlington, vol. 29, No. 4, Apr. 1986 (pp. 581-588.
Fan W., et al., "Applying SP-MLP to Complex Classification Problems", *Pattern Recognition Letters, North-Holland Publ*, vol. 21, No. 1, Jan. 2000, pp. 9-19.
International Search Report including Notification of Transmittal of the International Search Report, International Search Report and Written Opinion of the International Searching Authority.

* cited by examiner

*Primary Examiner*—Vikkram Bali
*Assistant Examiner*—Daniel Zeilberger (57) ABSTRACT

A method for classifying features in a digital medical image includes providing a plurality of feature points in an N-dimensional space, wherein each feature point is a member of one of two sets, determining a classifying plane that separates feature points in a first of the two sets from feature points in a second of the two sets, transforming the classifying plane wherein a normal vector to said transformed classifying plane has positive coefficients and a feature domain for one or more feature points of one set is a unit hypercube in a transformed space having n axes, obtaining an upper bound along each of the n-axes of the unit hypercube, inversely transforming said upper bound to obtain a new rule containing one or more feature points of said one set, and removing the feature points contained by said new rule from said one set.

27 Claims, 3 Drawing Sheets

SYSTEM AND METHOD FOR FEATURE IDENTIFICATION IN DIGITAL IMAGES BASED ON RULE EXTRACTION

CROSS REFERENCE TO RELATED UNITED STATES APPLICATIONS

This application claims priority from "Rule extraction from Hyperplane-based Classifiers", U.S. Provisional Application No. 60/577,792 of Glenn Fung, et al., filed Jun. 8, 2004, the contents of which are incorporated herein by reference.

TECHNICAL FIELD

This invention is directed to rule extractors for classifying digital data, in particular for identifying features and objects in digital medical images.

DISCUSSION OF THE RELATED ART

Physicians and scientists have long explored the use of artificial intelligence systems in medicine. One area of research has been building computer-aided diagnosis (CAD) systems for the automated interpretation and analysis of medical images, in order to classify and identify normal and abnormal features in a dataset. For example, such systems could be used for classifying and identifying polyps, tumors, and other abnormal growths from normal tissue in a digital medical image of a patient. Despite the demonstrated success of many such systems in research labs and clinical settings, these systems were not widely used, or even available, in clinical practice.

One barrier to the use of these systems in the United States is the reluctance of the United States Government agencies to allow the use of "black box" systems that could influence patient treatment. Although the Food and Drug Administration (FDA) has recently granted approval for CAD systems based on "blackbox" classifiers, the barrier to entry remains very high. These systems may currently only be used as "second-readers", to offer advice after an initial physician's diagnosis. Moreover, these CAD systems must receive pre-market approval (PMA). A PMA is equivalent to a complete clinical trial, similar to those used for new drugs, where the CAD system must demonstrate statistically significant improvement in diagnostic performance when used by physicians on a large number of completely new cases. The FDA has indicated that the barrier to entry could be significantly lowered for CAD systems that are able to explain their conclusions. However, this will not lower the barrier in terms of generalization performance on unseen cases, but the FDA is potentially willing to consider using performance on retrospective cases and significantly reduce the number of cases needed for a prospective clinical trial. This would aid the acceptance of these systems, because a full-blown clinical trial can add several years delay to the release of a CAD system into general clinical practice.

Much research in the field of artificial intelligence, knowledge discovery and data mining has focused on endowing systems with the ability to explain their reasoning, both to make the consultation more acceptable to the user, and to help the human expert to more easily identify errors in any conclusion reached by the system. On the other hand, when building classifiers from medical data sets, the best performance is often achieved by "black-box" systems, such as, Support Vector Machines (SVMs).

Support Vector Machines (SVMs) and other linear classifiers are popular methods for building hyperplane based classifiers from data sets, and have been shown to have excellent generalization performance in a variety of applications. These classifiers, however, are hard to interpret by humans. For instance, when an unlabeled example is classified by the linear classifier as positive or negative, the only explanation that can be provided is that some linear weighted sum of the variables of the example are lower (or higher) than some threshold; such an explanation is completely non-intuitive to human experts. Humans are more comfortable dealing with rules that can be expressed as a hypercube with axis-parallel surfaces in the variable space. Recent work includes rule extraction for neural networks, but little work has been done to extract rules from SVMs or other hyperplane-based classifiers.

The ability to provide explanations of decisions reached by "black-box" classifiers is not only important for physician acceptance, but it is also an important step in potentially reducing the regulatory requirements for introducing a medical decision-support system based on such a classifier into clinical practice.

SUMMARY OF THE INVENTION

Exemplary embodiments of the invention as described herein generally include methods and systems for converting linear support vector machines and any other arbitrary hyperplane-based linear classifiers into a set of non-overlapping rules that, unlike the original classifier, can be easily interpreted by humans. This rule set is (asymptotically) equivalent to the original linear classifier and can cover most of the training examples in the hyperplane halfspace. Each iteration of the rule extraction is formulated as one of two possible optimization problems based on different "optimal" rule criteria. The first formulation, which seeks to maximize the volume covered by each rule, is a constrained nonlinear optimization problem whose solution can be found by obtaining the closed form solution of a relaxed associated unconstrained problem. The second formulation, which maximizes the number of samples covered by each rule, requires the solution of a linear programming problem. The rule extraction techniques according to an embodiment of the invention involve solving a linear programming problem in 2n variables where n is the number of input features (after feature selection). The ability to convert SVM's and other "black-box" classifiers into a set of human-understandable rules encourages physician acceptance and helps reduce regulatory barriers for medical-decision support systems based on such classifiers.

According to one aspect of the invention, there is provided a method for classifying features in a digital medical image including providing a plurality of feature points in an N-dimensional space, wherein said feature points have been extracted from a digital medical image, wherein each feature point is a member of one of two sets, determining an approximate classifying plane that separates feature points in a first of the two sets from feature points in a second of the two sets, transforming the classifying plane wherein a normal vector to said transformed classifying plane has positive coefficients and a feature domain for one or more feature points of one of said two sets is a unit hypercube in a transformed space having n axes, obtaining an upper bound along each of the n-axes of the unit hypercube, inversely transforming said upper bound to obtain a new rule containing one or more feature points of said one of said two sets, and removing the feature points contained by said new rule from said one of two sets.

According to a further aspect of the invention, the method further comprises initializing a set of rules to an empty set, and forming a union of said rule set with said new rule.

According to a further aspect of the invention, if said one of two sets is not empty after removal of said feature points, further comprising, for each of n subregions not covered by said new rule, inversely transforming said subregion, repeating said steps of transforming the classifying plane, obtaining an upper bound, inversely transforming said upper bound to obtain a new rule, and removing the feature points contained by said new rule, until said one of two sets is empty, and forming a union of said rule set with each said new rule.

According to a further aspect of the invention, the steps are repeated for those subregions of said n subregions that contain feature points in said one of two sets, and further comprising the step of searching each subregion for feature points in said one of two sets.

According to a further aspect of the invention, each new rule obtained by repeating said steps has zero intersection with each rule in said rule set.

According to a further aspect of the invention, each subregion is searched according to a depth first search.

According to a further aspect of the invention, obtaining an upper bound along each of the n-axes of the unit hypercube comprises determining a sub-hypercube of said unit hypercube with a largest possible volume.

According to a further aspect of the invention, obtaining an upper bound along each of the n-axes of the unit hypercube comprises determining a sub-hypercube of said unit hypercube with a maximum number of feature points in said one of two sets.

According to a further aspect of the invention, a hypercube defined by said new rule has a vertex lying on said classifying plane.

According to a further aspect of the invention, said unit hypercube in said transformed space has a vertex at the origin of the coordinate system of said transformed space.

According to a further aspect of the invention, the method further comprises providing a new feature point, defining a normal from said new feature point to said classifying plane, and defining the intersection of said normal with said classifying plane as a vertex of a hypercube that contains said new feature point at the center of the hypercube.

According to another aspect of the invention, there is provided a program storage device readable by a computer, tangibly embodying a program of instructions executable by the computer to perform the method steps for classifying features in a digital medical image.

DETAILED DESCRIPTION OF THE PREFERRED EMBODIMENTS

Exemplary embodiments of the invention as described herein generally include systems and methods for performing a polygonal surface to image registration in medical images using ray-casting to find corresponding points.

Notation: $A \in R^{m \times n}$ signifies a real m×n matrix. For such a matrix, A' will denote the transpose of A and $A_i$ will denote the i-th row of A. All vectors will be column vectors. For $x \in R^n$, $\|x\|_p$ denotes the p-norm, $p=1, 2, \infty$. A vector of ones in a real space of arbitrary dimension will be denoted by e. Thus, for $e \in R^m$ and $y \in R^m$, e'y is the sum of the components of y. A vector of zeros in a real space of arbitrary dimension will be denoted by 0. A separating hyperplane, with respect to two given point sets A and B, is a plane that attempts to separate $R^n$ into two halfspaces such that each open halfspace contains points mostly of A or B. A bounding plane to the set A is a plane that places A in one of the two closed halfspaces that the plane generates. The symbol $\wedge$ will denote the logical "and" and the symbol $\vee$ will denote the logical "or". The abbreviation "s.t." stands for "such that". For a vector $x \in R^n$, the sign function sign(x) is defined as $\text{sign}(x)_i=1$ if $x_i>0$ else $\text{sign}(x)_i=-1$ if $x_i \leq 0$, for $i=1, \ldots, n$.

Feature classification in a digital dataset can be regarded as an example of classifying m points in an n-dimensional input space $R^n$ as being members of one of classes. The set of points can be represented by an m×n matrix A, where the $i^{th}$ point is represented by a row $A_i$. Each point $A_i$ is a member of either class A+ or A−, and this classification can be represented by an m×m diagonal matrix D with plus ones or minus ones along its diagonal. If the classes are linearly separable, a plane w'x=γ will separate the two classes, where x is any point on the separating plane, w is a normal to that plane, and γ is the distance from the origin to that plane. If the classes are linearly inseparable, which is often the case in real-world datasets, then the separation plane can be bounded by two planes that define a "soft margin" (i.e. bounded approximately with some error) determined by a nonnegative error variable $\epsilon$, that is:

$$A_i w + \epsilon_i \geq \gamma + 1, \text{ for } D_{ii} = 1,$$

$$A_i w - \epsilon_i \geq \gamma - 1, \text{ for } D_{ii} = 1,$$

Minimizing the error variable $\epsilon$ results in an approximate separating plane. This plane classifies data as follows, for an $x \in A$:

$$\text{sign}(x'w - \gamma) \begin{cases} = 1, & \to x \in A+, \\ = -1, & \to x \in A-, \end{cases}$$

where sign(.) is the sign function defined above.

This system can be represented by the following linear program with weight parameter $v > 0$:

$$\min_{(w, \gamma, \varepsilon, t) \in R^{n+1+m}} v e' \varepsilon + e' t$$

$$s.t. \begin{cases} D(Aw - e\gamma) + \varepsilon \geq e \\ t \geq w \geq -t \\ \varepsilon \geq 0 \end{cases}$$

which is equivalent to the following linear programming support vector machine (LP-SVM):

$$\min_{(w,\gamma,\varepsilon)\in R^{n+1+m}} ve'\varepsilon + \|w\|_1 \quad (1)$$

$$s.t. \begin{cases} D(Aw - e\gamma) + \varepsilon \geq e \\ \varepsilon \geq 0 \end{cases}$$

where $\|\ \|_1$ denotes the 1-norm as defined above. The 1-norm of the error variable $\varepsilon$ can be minimized parametrically with weight $v$ according to methods known in the art, resulting in an approximate separating plane.

Figure 1:
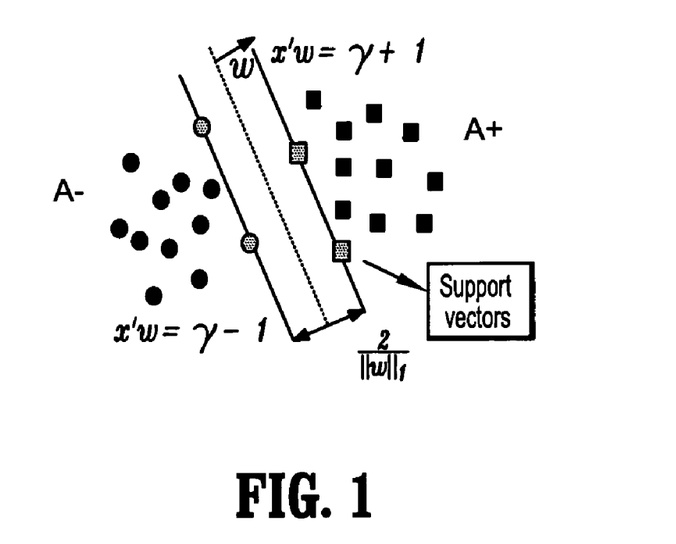
FIG. 1 depicts an exemplary, non-limiting LP-SVM classifier in the w-space of $R^n$, according to an embodiment of the invention.

FIG. 1 depicts an exemplary, non-limiting LP-SVM classifier in the plane in $R^n$ containing w, according to an embodiment of the invention. The "soft margin" that approximately separates points in A+ from points in A− is indicated by the solid lines, while the plane represented by the above equations that separates the points of A+ from those of A− is indicated by the dotted line in the soft margin.

The 1-norm formulation used above typically generates very sparse solutions, which results in the normal w to the separating plane x'w=γ having many zero components. This property of w implies that many input space features do not play a role in determining the linear classifier. Since rule extraction techniques according to embodiments of the invention depend on the features used by the hyperplane classifier, a sparser normal vector w will lead to rules depending on a fewer number of features.

The solutions of equations (1) can be approximated by rules of the form $\wedge_{i=1}^{n} (l_i \leq x_i < u_i)$, where l and u are lower and upper bounds, respectively. In seeking rules of this form, one seeks appropriate lower and upper limits l and u. A rule of this form defines an n-dimensional hypercube region I={x s.t. w'x<γ, $l_i \leq x_i \leq u_i$, $1 \leq i \leq n$} with edges parallel to the axes. The system for constructing classification rules for this region I based on the classification hyperplane w'x=γ can be denoted by P−(w, γ, I). The lower and upper edges for the $i^{th}$ dimension are, respectively, $l_i$ and $u_i$. Rules of this form are very intuitive and can be easily interpreted by humans. Note that the system for extracting rules from the complementary set I'={x s.t. w'x>γ, $l_i \leq x_i \leq u_i$, $1 \leq i \leq n$}, denoted by $P_+(w, \gamma, I')$, is equivalent to P−(−w, −γ, I).

According to an embodiment of the invention, this formulation can be transformed to a formulation with positive hyperplane coefficients, γ=1, and the feature domain being the unit hypercube $I_0 = [0, 1]^n$, according to the linear transformation y=T(x−b). In this transformed formulation, the transformed lower limit l' is the origin, and one is concerned with approximating a transformed upper limit that is less than 1. The matrix T of the transformation is a diagonal matrix defined by $$T_{ii} = \frac{\text{sign}(w_i)}{u_i - l_i}, \quad i \in \{1, \ldots, n\}$$

and b a vector with components $$b = \{u_i \text{ if } w_i < 0, l_i \text{ if } w_i > 0\}.$$

The $u_i$ and $l_i$ used in the definition of $T_{ii}$ and b can be approximated from bounds on the data points themselves. The inverse is the affine transformation $x = T^{-1}y + b$. The hyperplane of interest becomes $$w'T^{-1}y = \gamma - w'b,$$

which is equivalent to $$\tilde{w}y = \left(\frac{w'T^{-1}}{\gamma - w'b}\right)y = 1.$$

In addition, $$w_i > 0 \Rightarrow 0 \leq y_i = \frac{T_{ii}}{u_i - l_i} = \frac{x_i - l_i}{u_i - l_i} \leq 1$$

and $$w_i < 0 \Rightarrow 0 \leq y_i = \frac{T_{ii}}{u_i - l_i} = \frac{-(x_i - u_i)}{u_i - l_i} = \frac{u_i - x_i}{u_i - l_i} \leq 1,$$

thus the hypercube I is transformed to $I_0 = [0, 1]^n$, and the system becomes $P-(\tilde{w}, 1, I_0)$ in the new domain $I_0 = \{y$ s.t. $\tilde{w}'y < 1, 0 \leq y_i \leq 1, 1 \leq i \leq n\}$. Note that the components of $\tilde{w}$ are positive since w'b<γ and $w_i T_{ii}^{-1} > 0$.

In order to obtain a set of disjoint rules that are easy to generate, the hypercube defined by an extracted rule $\wedge_{i=1}^{n}$ ($l_i \leq x_i < u_i$) should be a subset of a bounded region I={x s.t. w'x<γ}. Furthermore, the resulting hypercube subset defined by the extracted rule should contain one vertex that lies in the separating hyperplane w'x−γ=0. Given a region I, different "optimal" rule sets can be defined according to different criteria.

Figure 2:
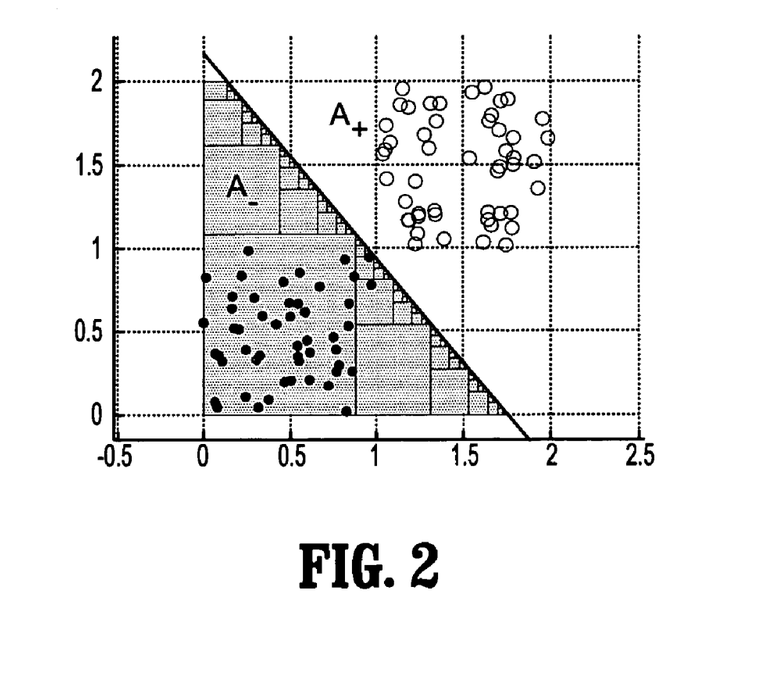
FIG. 2 depicts an exemplary 2-dimensional LP-SVM of non-overlapping rules, according to an embodiment of the invention.

FIG. 2 depicts an exemplary 2-dimensional LP-SVM example of non-overlapping rules, according to an embodiment of the invention. The half space A+ occupies the right hand side of the plane, while the half space A− occupies the left hand side. Points in A+ are represented by open circles, while points in A− are represented by dots. The non-overlapping rules covering the halfspace A− ({x s.t. w'x<γ}) are represented as rectangles, which are bounded regions. Note that each rectangle depicted in FIG. 2 contains one vertex that lies in the separating hyperplane w'x−γ=0. The halfspace w'x<γ is almost totally covered by rules represented by rectangles with a vertex in the hyperplane w'x−γ=0. The rectangles include all data points in the set to be classified.

Given a definition of an optimal rule set, an iterative procedure can be used to extract as many rules as required to describe adequately the region of interest. Once a rule for an n-dimensional feature space has been extracted, there are n new similar systems to solve. If the first rule extracted from the transformed system $P-(\tilde{w}, 1, I_0)$ is $\wedge_{i=1}^{n}$ ($0 \leq x_i \leq x_i^*$), then the remaining volume on the side of the hyperplane that is not covered by the rule is the union of n nonintersecting regions similar to the original region, defined by:

$$I_i = x \in R^n, s.t. \begin{cases} 0 \leq x_j < x_j^*, \forall j < i \\ x_i^* \leq x_i < 1 \\ 0 \leq x_j < 1, \forall j > i \end{cases},$$

that is, the rule inequalities for the first i−1 components of x are satisfied, the inequality that relates to the $i^{th}$ component is not satisfied, and the rest are free. These sub-volumes $I_i$ are non-intersecting, and the rules corresponding to each sub-volume will be independent. Next, an optimal rule can be extracted for each of these regions that contains a data point. An exemplary method of finding a region containing a data point is a depth first search, however, other search algorithms as are known in the art, such as breadth first search, can be used. The system for $I_i$ can be denoted by $P-(\tilde{w}, 1, I_i)$, and the same linear transformation as described above can be used to transform each of the n subsystems $P-(\tilde{w}, 1, I_i)$ to systems equivalent to the original system $P-(\tilde{w}, 1, I_0)$.

According to one embodiment of the invention, an optimal rule can be defined as a rule that covers the hypercube $I_0$ with axis-parallel faces with the largest possible volume. Since the log function is a strictly increasing function, an optimal rule is a rule that maximizes the log of the volume of the region that it encloses, instead of the volume. This rule can be found by solving $$\max_{x \in R^n} \log\left(\prod_{i=1}^{n} x_i\right) s.t. \sum_{i=1}^{n} w_i x_i = \gamma, 0 \leq x \leq 1. \quad (2)$$

A first approximation to a solution for this equation involved relaxing the constraint on x:

$$\max_{x \in R^n} \log\left(\prod_{i=1}^{n} x_i\right) s.t. \sum_{i=1}^{n} w_i x_i = \gamma.$$

The optimality conditions for this relaxed equality formulation are:

$$\frac{1}{x_i} = -\lambda w_i = 0, i \in \{1, \ldots, n\}, wx - y = 0,$$

where $\lambda$ is a Lagrange multiplier. These optimally conditions yield the following closed form solution:

$$\tilde{x}_i = \frac{1}{\lambda w_i} = \frac{\lambda}{n w_i}, i \in \{1, \ldots, n\}, \lambda = \frac{n}{\lambda}.$$

A solution $x^*$ of the original optimization problem can be obtained from the approximate solution by defining $x^*$ as:

$$x_i^* = \frac{1}{\lambda^* w_i} \text{ if } \tilde{x}_i \leq 1, i \in \{1, \ldots, n\}$$
$$= 1, \text{ otherwise,}$$

where $\lambda^* = \frac{n_i}{\gamma - \sum_{i \in A} w_i}$, $A = \{i/\tilde{x}_i > 1\}$, and $n_1 = n - |A|$.

If $0 \leq x_i^* \leq 1$, $\forall i \in \{1, \ldots, n\}$, then $x^*$ is an optimal solution for equation (2), otherwise one can define $\tilde{x} = x^*$ and recalculate $x^*$ until $0 \leq x_i^* \leq 1$, $\forall i \in \{1, \ldots, n\}$. The $x^*$ found by this method defines an upper bound for a dimension of transformed hypercube $I_0$. Application of the inverse linear transform $T^1$ will transform $[0, x^*]$ into $[l_i, u_i]$.

According to another embodiment of the invention, an optimal rule can be defined as a rule that covers the hypercube with axis-parallel faces with that contains the largest possible number of training points in the halfspace. Such a rule can be found by finding $x^*$ such that $w'x^* - \gamma = 0$ and $|C|$ (cardinality of C) is maximal, where:

$$C = (A - \cap \{x | w'x < 1\}) \cap \{x | 0 \leq x \leq x^*\}.$$

The following linear programming formulation is an approximation to this system:

$$\min_{x, y} e' y$$
$$s.t. \begin{array}{l} w'x = 1 \\ A_{-i} - ey_i \leq x_i, \forall i \in \{1, \ldots, n\}, 0 \leq x \leq x^*, y \geq 0 \end{array}$$

where the variable $y \geq 0$ acts as a slack or error variable that is minimized in order in order for the rule to cover the largest possible number of points. Again, the $x^*$ found by this method defines an upper bound for a dimension of transformed hypercube $I_0$. Application of the inverse linear transform $T^1$ will transform $[0, x^*]$ into $[l_i, u_i]$.

Figure 3:
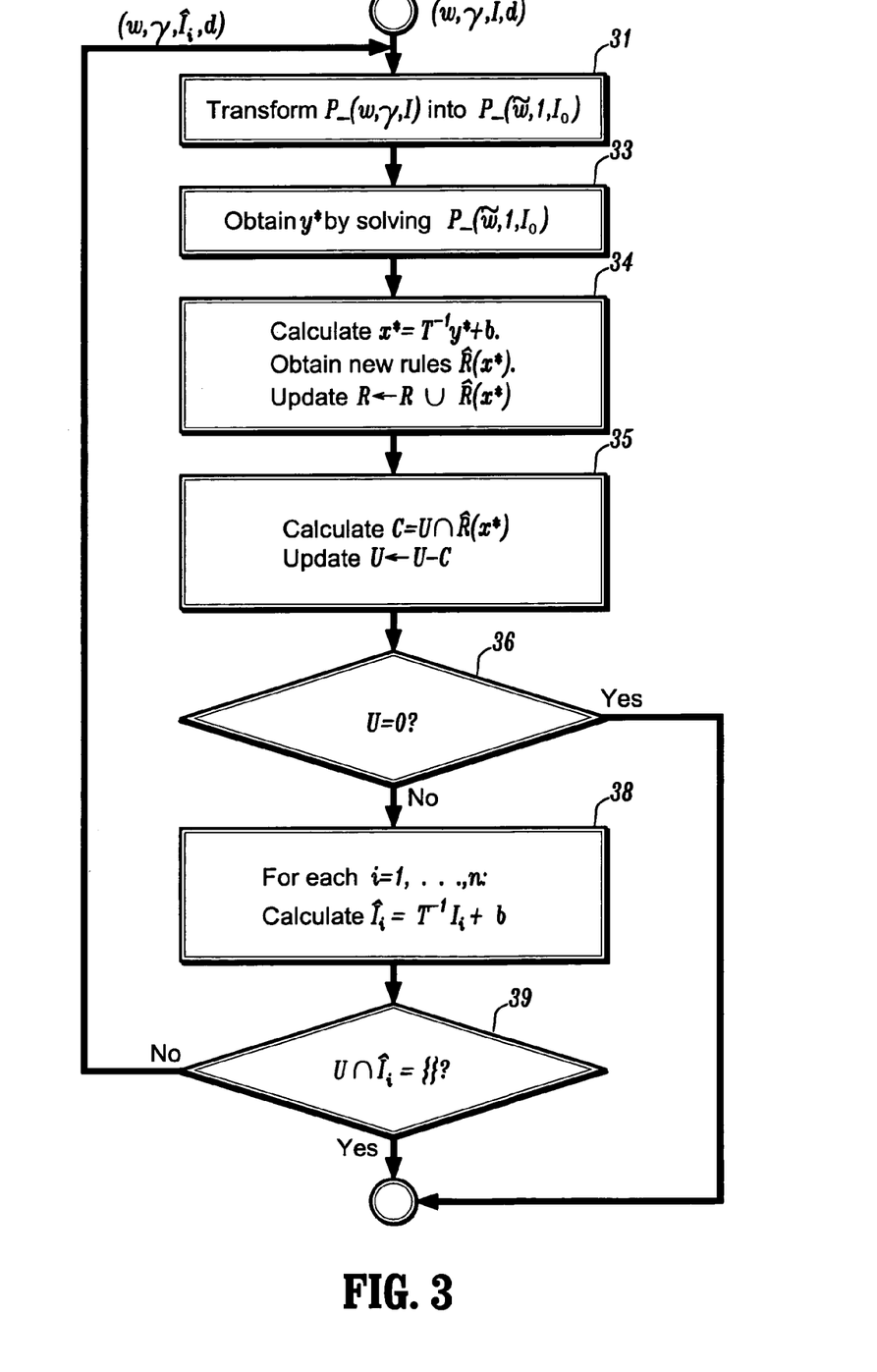
FIG. 3 depicts a flow chart of a rule extraction method according to an embodiment of the invention.

FIG. 3 presents a flow chart of a procedure according to an embodiment of the invention for obtaining a set of rules R that cover all the training points belonging to A, such that $w'x < \gamma$. In the following, R is the set containing the extracted rules, and U is the set containing the indices of the points that are to be covered by the rules in R. Before starting the procedure, R and U can be initialized to $\Leftrightarrow$ and A– respectively, and initial values of w and $\gamma$ can be obtained by solving the LP-SVM presented above.

First, at step 31, the system $P-(w, \gamma, I)$ is transformed into $P-(\tilde{w}, 1, I_0)$ using the linear transformation T described above. Next, at step 33, a solution $y^*$ is obtained by solving the system $P-(\tilde{w}, 1, I_0)$. Exemplary, non-limiting methods for solving the system $P-(\tilde{w}, 1, I_0)$ include the volume maximizing criteria and the point coverage maximizing criteria presented above. Then, at step 34, x is calculated from $x^* = T^1 y^* + b$, from which new new rules $R(x^*)$ are obtained. Then, the rule set is updated according to $R \leftarrow R \cup R(x^*)$. At step 35, calculate $C = \{x \in U \text{ s.t. } R(x^*) \text{ is true}\} = U \cap R(x^*)$, a set containing the indices of the points in U that are covered by the new obtained rule. U is updated as $U \leftarrow U - C$, that is, by subtracting those points covered by the new rule from set of remaining data points. If, at step 36, $U = \Leftrightarrow$ all data points have been covered and the process stops.

Otherwise, at step 38, the n remaining subregions not covered by the rules R, defined above by $$I_i = x \in R^n, s.t. \begin{cases} 0 \leq x_j < x_j^*, \forall j < i \\ x_i^* \leq x_i < 1 \\ 0 \leq x_j < 1, \forall j > i \end{cases},$$

are solved. These subregions can be visited according to a depth first search algorithm, as discussed above. For each of these regions $I_i$, the inverse transformation $T^1$ is applied: $\hat{I}_i = T^{-1} I_i + b$. Then, at step 39, if $U \# \hat{I}_i \neq \Leftrightarrow$ not all data points in the subregions have been covered, and the preceding steps are applied recursively to system $P-(w, \gamma, \hat{I}_i)$. Otherwise, the rule extraction process has covered all data points, and the process exits.

According to another embodiment of the invention, the search for subregions containing training points at step 38 can be limited by the use of a depth parameter. This depth parameter, denoted by d, can be initialized to one, and a maximum value for the depth parameter, $d_{max}$ is assigned. This depth maximum value is typically less than 20. The depth parameter is incremented after step 36 if the set U is not empty, and is compared to the maximum value each time the process is recursively called to solve system P–(w, γ, Î$_i$). The process terminates if the depth parameter exceeds the maximum.

Empirical results on several real-world data sets have demonstrated the efficacy and speed of methods according to embodiments of the invention.

According to another embodiment of the invention, an explanation of a classification for a new unlabeled test example can be provided. If no rule covers a particular test example, a rule extraction procedure can be executed on the region I that contains the test example until a covering rule is found. However, the resulting rule may cover a very small volume around the test example, which limits the usefulness of the explanation. Alternatively, the volume maximization criteria can be revised to extract just one rule—the largest possible hypercube (rule) which contains the test example. Such a rule, however, may lack explanatory value because in many cases the test example will lie on one of the surfaces of the hypercube.

According to another embodiment of the invention, an explanation for a test sample may be provided by a rule where the example lies well within the interior of the rule, far away from the bounding spaces. A rule that provides an "optimal" explanation can be created by drawing a normal from the test sample to the hyperplane, and defining the intersection of the normal with the hyperplane as a corner of a uniquely defined bounding hypercube (rule), which centrally contains the test sample. In addition, a confidence can be associated with the explanation (rule), by weighting factors such as the coverage of the training examples in A+ (A–), whether the rule contains only all positive (negative) training samples, the size of the newly defined hypercube, and the distance of the test sample from the hyperplane. In general, these criteria can be applied to any explanatory rule, not just the "optimal" explanatory rules created as defined herein.

According to another embodiment of the invention, the rule extraction techniques disclosed herein can be combined with a knowledge-based SVM to design an incremental algorithm to handle massive amounts of data. The algorithm could "compress" training data in the form of rules obtained from different "chunks" and then integrate the obtained rules into a knowledge-based SVM.

According to another embodiment of the invention, the rule extraction techniques disclosed herein can incorporate feature selection, so that rules could be generated that depend on different features instead of the same preselected subset of features.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 4:
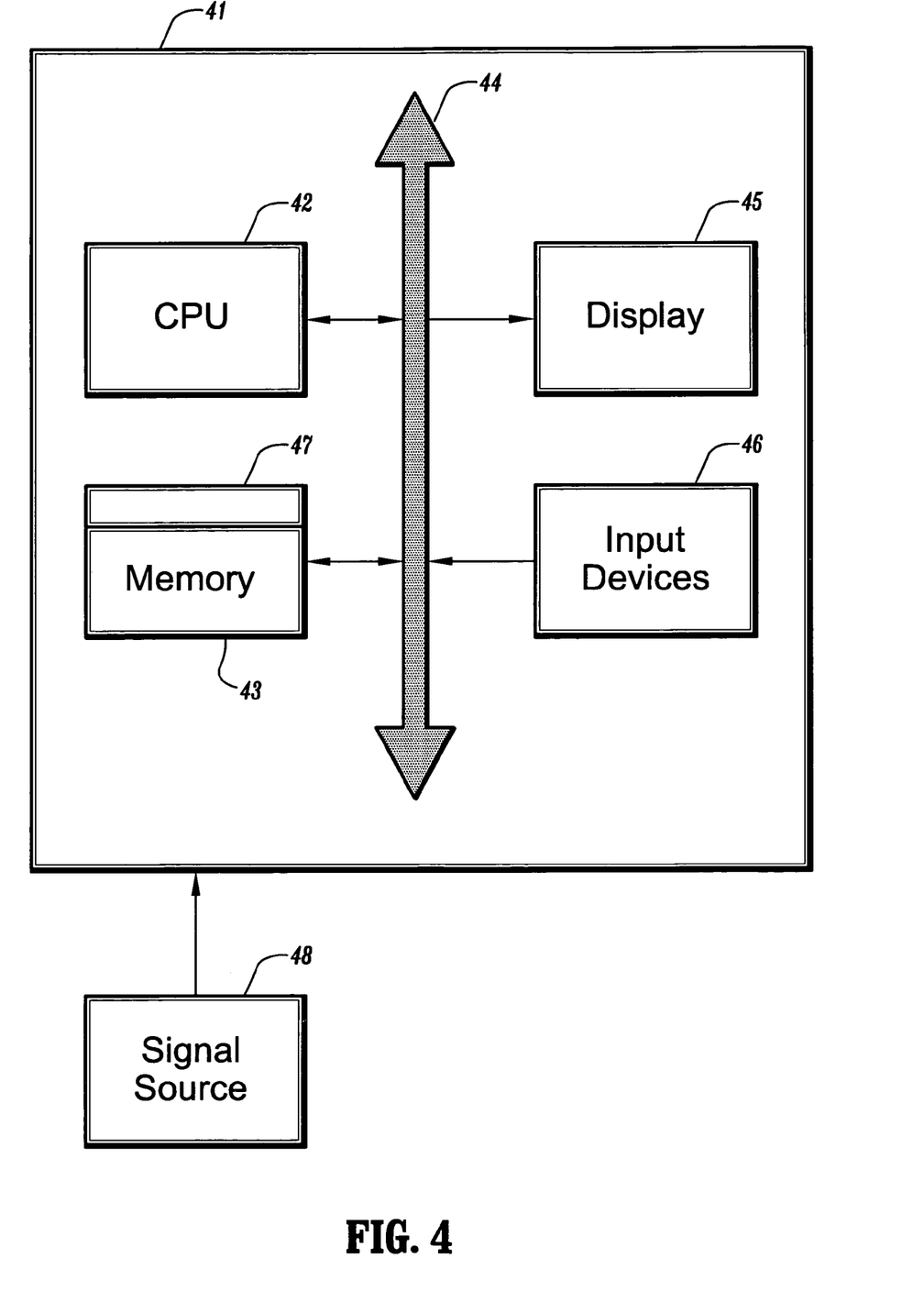
FIG. 4 is a block diagram of an exemplary computer system for implementing a rule extraction scheme according to an embodiment of the invention.

Referring now to FIG. 4, according to an embodiment of the present invention, a computer system 41 for implementing the present invention can comprise, inter alia, a central processing unit (CPU) 42, a memory 43 and an input/output (I/O) interface 44. The computer system 41 is generally coupled through the I/O interface 44 to a display 45 and various input devices 46 such as a mouse and a keyboard. The support circuits can include circuits such as cache, power supplies, clock circuits, and a communication bus. The memory 43 can include random access memory (RAM), read only memory (ROM), disk drive, tape drive, etc., or a combinations thereof. The present invention can be implemented as a routine 47 that is stored in memory 43 and executed by the CPU 42 to process the signal from the signal source 48. As such, the computer system 41 is a general purpose computer system that becomes a specific purpose computer system when executing the routine 47 of the present invention.

The computer system 41 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device. It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for classifying features in a digital medical image, said method comprising:
   using a computer to perform the steps of:
   providing a plurality of feature points in an n-dimensional space, wherein said feature points have been extracted from a digital medical image, wherein each feature point is a member of one of two sets;
   determining an approximate classifying plane that separates feature points in a first of the two sets from feature points in a second of the two sets;
   transforming the classifying plane wherein a normal vector to said transformed classifying plane has positive coefficients and a feature domain for one or more feature points of one of said two sets is a unit hypercube in a transformed space having n axes;
   finding a subregion of said unit hypercube containing at least one feature point wherein a transformed rule is extracted;
   inversely transforming said transformed rule to obtain a new rule containing one or more feature points of said one of said two sets, wherein said new rule defines a hypercube that is a subset of one of the two feature sets and wherein said hypercube has a vertex that lies in the classifying plane; and
   removing the feature points contained by said new rule from said one of two sets.

2. The method of claim 1, further comprising initializing a set of rules to an empty set, and forming a union of said rule set with said new rule.

3. The method of claim 2, wherein if said one of two sets is not empty after removal of said feature points, further comprising, for each of n subregions not covered by said new rule, repeating said steps of transforming the classifying plane, finding a subregion of said unit hypercube, inversely transforming said subregion to obtain a new rule, and removing the feature points contained by said new rule, until said one of two sets is empty, and forming a union of said rule set with each said new rule.

4. The method of claim 3, wherein said steps are repeated for those subregions of said n subregions that contain feature points in said one of two sets.

5. The method of claim 3, wherein each new rule obtained by repeating said steps has zero intersection with each rule in said rule set, and wherein said rule set converges to a complete covering of said feature points in said one of two sets.

6. The method of claim 1, wherein finding a subregion comprises performing a depth first search.

7. The method of claim 1, wherein said transformed rule extracted from said subregion defines a sub-hypercube of said unit hypercube with a largest possible volume.

8. The method of claim 1, wherein said transformed rule extracted from said subregion defines a sub-hypercube of said unit hypercube with a maximum number of feature points in said one of two sets.

9. The method of claim 1, wherein said unit hypercube in said transformed space has a vertex at the origin of the coordinate system of said transformed space.

10. A method for classifying features in an image, said method comprising:
using a computer to perform the steps of:
providing a plurality of feature points in an n-dimensional space, wherein each feature point is a member of one of two sets;
determining an approximate classifying plane that separates feature points in a first of the two sets from feature points in a second of the two sets;
transforming the classifying plane into an n-dimensional transformed space;
finding a subregion of said unit hypercube containing at least one feature point wherein a transformed rule is extracted;
inversely transforming said transformed rule to obtain a new rule containing one or more feature points of said one of said two sets; and
removing the feature points contained by said new rule from said one of two sets;
repeating for each of said n subregions that contain feature points of said first set and are not covered by said new rule, if said first set is not empty after removal of said feature points, said steps of transforming the classifying plane, finding a subregion wherein a transformed rule is extracted, inversely transforming said transformed rule to obtain another new rule, and removing the feature points contained by said new rule, until said first set is empty; and
forming a rule set from a union of each said new rule, wherein each new rule has zero intersection with each other rule in said rule set, and wherein said rule set converges to a complete covering of said feature points in said one of two sets.

11. The method of claim 10, further comprising providing a new feature point, defining a normal from said new feature point to said classifying plane, and defining the intersection of said normal with said classifying plane as a vertex of a hypercube that contains said new feature point at the center of said hypercube.

12. The method of claim 10, wherein said feature points have been extracted from an image.

13. The method of claim 12, wherein said image is a digital medical image.

14. The method of claim 10, wherein said transformed space includes a normal vector to said transformed classifying plane with positive coefficients.

15. The method of claim 10, wherein said transformed space includes a feature domain for one or more feature points of a first of said two sets that is a unit hypercube having n axes with a vertex at the origin.

16. A program storage device readable by a computer, tangibly embodying a program of instructions executable by the computer to perform the method steps for classifying features in a digital medical image, said method comprising the steps of:
providing a plurality of feature points in an N-dimensional space, wherein said feature points have been extracted from a digital medical image, wherein each feature point is a member of one of two sets;
determining an approximate classifying plane that separates feature points in a first of the two sets from feature points in a second of the two sets;
transforming the classifying plane wherein a normal vector to said transformed classifying plane has positive coefficients and a feature domain for one or more feature points of one of said two sets is a unit hypercube in a transformed space having n axes;
finding a subregion of said unit hypercube containing at least one feature point wherein a transformed rule is extracted;
inversely transforming said transformed rule to obtain a new rule containing one or more feature points of said one of said two sets, wherein said new rule defines a hypercube that is a subset of one of the two feature sets and wherein said hypercube has a vertex that lies in the classifying plane; and
removing the feature points contained by said new rule from said one of two sets.

17. The program storage device readable by a computer of claim 16, the method further comprising initializing a set of rules to an empty set, and forming a union of said rule set with said new rule.

18. The program storage device readable by a computer of claim 17, wherein if said one of two sets is not empty after removal of said feature points, further comprising, for each of n subregions not covered by said new rule, repeating said steps of transforming the classifying plane, finding a subregion of said unit hypercube, inversely transforming said subregion to obtain a new rule, and removing the feature points contained by said new rule, until said one of two sets is empty, and forming a union of said rule set with each said new rule.

19. The program storage device readable by a computer of claim 18, wherein said steps are repeated for those subregions of said n subregions that contain feature points in said one of two sets.

20. The program storage device readable by a computer of claim 18, wherein each new rule obtained by repeating said steps has zero intersection with each rule in said rule set, and wherein said rule set converges to a complete covering of said feature points in said one of two sets.

21. The program storage device readable by a computer of claim 16, wherein finding a subregion comprises performing a depth first search.

22. The program storage device readable by a computer of claim 16, wherein said transformed rule extracted from said subregion defines a sub-hypercube of said unit hypercube with a largest possible volume.

23. The program storage device readable by a computer of claim 16, wherein said transformed rule extracted from said subregion defines a sub-hypercube of said unit hypercube with a maximum number of feature points in said one of two sets.

24. The program storage device readable by a computer of claim 16, wherein said unit hypercube in said transformed space has a vertex at the origin of the coordinate system of said transformed space.

25. The method of claim 6, further comprising using a predetermined depth parameter to limit a depth of said search.

26. The program storage device readable by a computer of claim 21, wherein said method further comprises using a predetermined depth parameter to limit a depth of said search.

27. The method of claim 10, wherein each said rule defines a hypercube that is a subset of the one of two feature sets and wherein each said hypercube has a vertex that lies in the classifying plane.

* * * * *